(12) United States Patent
Hayata

(10) Patent No.: US 7,248,619 B2
(45) Date of Patent: Jul. 24, 2007

(54) RAKE RECEIVER AND RECEIVING METHOD

(75) Inventor: Toshihiro Hayata, Tokyo (JP)

(73) Assignee: NEC Corporation, Tokyo (JP)

( * ) Notice: Subject to any disclaimer, the term of this patent is extended or adjusted under 35 U.S.C. 154(b) by 607 days.

(21) Appl. No.: 10/415,663

(22) PCT Filed: Nov. 9, 2001

(86) PCT No.: PCT/JP01/09833

§ 371 (c)(1),
(2), (4) Date: Oct. 24, 2003

(87) PCT Pub. No.: WO02/39608

PCT Pub. Date: May 16, 2002

(65) Prior Publication Data

US 2004/0063420 A1    Apr. 1, 2004

(30) Foreign Application Priority Data

Nov. 9, 2000  (JP) .............................. 2000-341955

(51) Int. Cl.
*H04B 1/00* (2006.01)
(52) U.S. Cl. ..................... 375/130; 375/150; 375/343
(58) Field of Classification Search .............. 375/150, 375/148; 370/335, 441
See application file for complete search history.

(56) References Cited

U.S. PATENT DOCUMENTS 6,229,842 B1 * 5/2001 Schulist et al. ............ 375/148
6,333,934 B1 * 12/2001 Miura ........................ 370/441
2004/0233875 A1 * 11/2004 Hayashi ..................... 370/335

FOREIGN PATENT DOCUMENTS

| CN | 1251482 A | 4/2000 |
|---|---|---|
| EP | 0 984 561 A2 | 3/2000 |
| EP | 0 989 685 A2 | 3/2000 |
| JP | 8-181636 A | 7/1996 |
| JP | 10-173629 A | 6/1998 |
| JP | 11-98056 A | 4/1999 |
| JP | 2000-174729 A | 6/2000 |
| WO | WO 28608 A1 | 8/1997 |

\* cited by examiner

*Primary Examiner*—Chieh M. Fan
*Assistant Examiner*—Julia Tu
(74) *Attorney, Agent, or Firm*—Foley & Lardner LLP

(57) ABSTRACT

In a rake receiver, a correlation-value calculation section calculates correlation values between spreading codes and reception signals from an input terminal and outputs the calculated correlation values to a delayed-profile creation section and a difference-history creation section. The delayed-profile creation section determines average correlation values and issues the values as a delayed profile to a path selection section. For each reception timing, the difference-history creation section compares the latest correlation value with a previous correlation value held by the difference-history creation section, to determine a difference history, and issues the difference history to the path selection section. The path selection section rearranges the delayed profile in decreasing order of the average correlation values. When the delayed profile and the difference history satisfy all predetermined conditions, the path selection section assigns the corresponding reception timing to a finger and issues the reception timing to the finger section.

8 Claims, 4 Drawing Sheets

RAKE RECEIVER AND RECEIVING METHOD

TECHNICAL FIELD

The present invention relates to CDMA mobile communication systems, and more particularly to a rake receiver and a receiving method for efficiently selecting paths assigned to fingers.

BACKGROUND ART

The CDMA (Code Division Multiple Access) communication system is a communication system that allows communication for a plurality of users by assigning a discrete spreading code to each user. The CDMA communication system is characterized by making positive use of multipaths.

In wireless communication, a signal transmitted from a transmitter is affected by fading that occurs in connection with the movement of the transmitter or a receiver, diffraction due to a shield, attenuation, or the like. Thus, the signal transmitted from the transmitter is received by the receiver as multiple signals. The received multiple signals are referred to as "multipaths". Each individual reception signal in multipaths is referred to as a "path".

In TDMA (Time Division Multiple Access) and FDMA (Frequency Division Multiple Access), when one signal (a main signal) of such multipaths is to be received, other signals are regarded as noise that disturbs the main signal.

In CDMA, however, the multipaths are separated into individual paths and all the paths are processed as main signals. Such processing is performed to enhance the reception sensitivity. Rake receivers have a search function that involves separating the paths, determining individual reception timings, and assigning them to fingers. A finger is meant to have a receiving function corresponding to one reception timing.

FIG. 1 is a diagram showing the basic configuration of a conventional rake receiver for achieving the search function described above. As shown in FIG. 1, the rake receiver has a correlation-value calculation section 2, a delayed-profile creation section 3, a path selection section 4, and a finger section 5.

The correlation-value calculation section 2 calculates correlation values between spreading codes and reception signals input from an input terminal 1, at a certain cycle at all timings at which rake reception is possible. The correlation-value calculation section 2 issues the calculated correlation values to the delayed-profile creation section 3. The "correlation value" is a value determined by the following equation (1).

R[t][i]: an ith chip input signal at reception timing t, C[i]: an ith chip spreading code N: The number of chips for determining correlation Cor[f][n]: a correlation value of the nth determination at reception timing=t $$\mathrm{Cor}[t][n] = \sum_{i=0}^{N-1} (R[t][i] \times C[i]) \times (R[t][i] \times C[i])* \quad (1)$$

where A* represents the complex conjugate of A.

In the following description, the total number of reception timings will be expressed by "Ntmg".

The delayed-profile creation section 3 obtains correlation values for each reception timing, and determines an average correlation value by adding the correlation values by a predetermined number of times, to thereby create a delayed profile. FIG. 2 shows a delayed profile for individual reception timings.

The path selection section 4 compares the magnitudes of the average correlation values in the delayed profile, selects reception timing to be assigned to each finger, and issues the reception timing to the finger section 5.

In general, when a finger performs reception at reception timing at which the average correlation value is large, it is expected that a signal having a high Eb/IO (the ratio of energy per bit to interference power density) can be received. Here, FIG. 3 is a diagram showing relationships between reception timings shown in FIG. 2 and propagation channels. Reception timings A and A' have the same propagation channel from a transmitter to a receiver. In contrast, the reception timing B has a propagation channel from the transmitter to the receiver via a reflector. Thus, the propagation channel of the reception timing B is different from the propagation channel of the reception timings A and A'.

Meanwhile, when the reception timing A' and the reception timing B, which are shown in FIG. 2, are compared with each other, the average correlation value at the reception timing A' is larger. Thus, it appears to be better to assign the reception timing A' to a finger. When fading is considered, however, if the reception timing A has already been assigned to a finger, it is expected that assigning the reception timing B, which is different from the reception timing A in propagation channel from the transmitter to the receiver, to a finger can rather improve the characteristics, even though the average correlation value at the reception timing B is smaller.

Since the reception timings A and A' have the same propagation channel, they are affected by the same fading. Thus, for example, when the reception timing A is affected by fading and thus the reception power decreases, the reception power at the reception timing A' also decreases. Consequently, when only the reception timings A and A' are assigned to fingers, the reception characteristics can deteriorate.

In contrast, even when the reception power at the reception timing A decreases due to fading, this decrease does not necessarily mean a decrease at the reception timing B, since the reception timings A and B have the different propagation channels. This can therefore prevent deterioration of the reception characteristics which is due to fading. This is basically because, when the propagation channels are different, the influences of fading are also different.

The number of fingers is generally limited due to restrictions of hardware. Thus, assignment of paths of different propagation channels to fingers with efficiency has a great influence on the reception characteristics in rake reception.

The number of fingers which is limited due to restrictions of hardware will hereinafter be expressed by "Nfgr".

Conventionally, in path assignment to fingers, when comparison of reception timings shows that the difference (A=abs (reception timing for the path A)−(reception timing for the path B)) is a predetermined threshold or smaller (A≦TH), the paths are recognized as having the same propagation channel and thus only one of the paths is assigned to a finger. On the other hand, when the difference is greater than the predetermined threshold (A>TH), the paths A and B are recognized as having channels different from each other.

In this case, abs (x) represents the absolute value of x and TH represents a predetermined threshold.

In such a conventional rake receiver, during finger assignment, whether or not paths have the same channel is determined based on only the difference between reception timings. Thus, paths which are almost the same in reception timing but are different in propagation channels are determined as being an identical path and one of the paths is deleted. Conversely, in some case, regardless of being an identical propagation channel, the path is determined as having different propagation channels for assignment to fingers. Thus, paths cannot be efficiently assigned, That is, in the conventional rake receiver, for paths which are different in propagation channels but are almost the same in propagation distance, a determination is made as being the same propagation channel. Thus, reception characteristics can deteriorate during fading.

An object of the present invention is to provide a rake receiver and a receiving method for efficiently assigning paths to fingers in such a manner that path separation is performed by looking at correlation between shift states of magnitudes of correlation values.

DISCLOSURE OF INVENTION

The present invention provides a rake receiver in a CDMA mobile communication system. The rake receiver includes a correlation-value calculation section for calculating correlation values between reception signals and spreading codes at all timings at which rake reception is possible. The rake receiver further includes a delayed-profile creation section for creating a delayed profile by determining an average correlation value from the correlation values, for each reception timing, obtained from the correlation-value calculation section. The rake receiver further includes a difference-history creation section for creating a difference history by comparing the latest correlation value issued from the correlation-value calculation section with a previous correlation value for each reception timing. The rake receiver further includes a path selection section for rearranging the average correlation values in decreasing order, selecting a reception timing to be assigned to a finger in decreasing order of the average correlation values when the delayed profile and the difference history satisfy respective predetermined conditions, and issuing the reception timing to a finger section. The rake receiver further includes the finger section for performing reception so as to correspond to a path for each reception timing.

That is, the present invention allows paths to be effectively assigned to fingers by calculating a shift in path intensity and using the calculated value for the delayed profile and for selection of paths to be assigned to fingers.

BEST MODE FOR CARRYING OUT THE INVENTION

Figure 1:
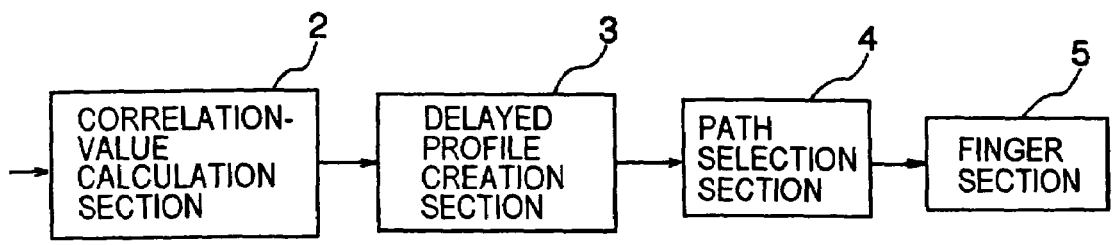
FIG. 1 is a diagram showing the basic configuration of a conventional rake receiver.

An embodiment of the present invention will now be described with reference to the accompanying drawings. FIG. 1 is a diagram showing the configuration of a rake receiver according to an embodiment of the present invention.

A correlation-value calculation section 2 calculates correlation values between spreading codes and reception signals input from an input terminal 1, at a certain period at all timings at which rake reception is possible. The calculated correlation values are input to a delayed-profile creation section 3 and also to a difference-history creation section 6. The definition of the "correlation value" is the same as in the conventional example.

The delayed-profile creation section 3 adds the correlation values by a predetermined number of times (hereinafter referred to as "Npow") for each reception timing. As a result, an average correlation value is determined and the result is issued as a delayed profile to a path selection section 4. Thus, the following processing is performed.

First, Cor[t][n] and DP[t][n] are defined as follows.

Cor[t][n]: The latest correlation value of the nth issuance from the correlation-value calculation section 2 at reception timing t DP[t][n]: Result determined by addition of a correlation value of the nth issuance at reception timing t Each time the latest correlation value Cor[t][n] is issued from the correlation-value calculation section 2, addition is performed for all reception timings t. For example, when a correlation value is of the nth issuance, it follows that DP[t][n]=DP[t][n−1]+Cor[t][n] for 0≦t<Ntmg.

In this case, when the above equation is of the (Npow)th calculation (i.e., n=Npow−1 when n begins at "0"), DP[t][n] is issued as a delayed profile to the path selection section 4, where DP[t][−1] is 0.

Further, also usable as the delayed profile is the average of shifts, in a predetermined-width time window, of correlation values issued from the correlation-value calculation section 2.

The difference-history creation section 6 compares the latest correlation value issued from the correlation-value calculation section 2 with a previous correlation value held by the difference-history creation section 6 and records a change in the magnitude. Specifically, the difference-history creation section 6 operates as in the following manner.

Hist[t][n]: difference history between a correlation value of the (n−1)th calculation and a correlation value of the nth calculation.

$$\text{Hist}[t][n]=\text{Fn}(\text{Cor}[t][n-1], \text{Cor}[t][n]) \quad (2)$$

where Fn (x, y)=[+1 (X≦Y), −1 (x>y)].

That is, Fn (x,y) is +1 in the range of (x>y) and is −1 in the range of (x>y).

When difference histories[t][n] (t=0 to Ntmg−1, n=0 to Npow−1) for Npow correlation values are determined for each reception timing, all the difference histories Hist[t][n] are issued to the path selection section 4.

The path selection section 4 rearranges the delayed profile issued from the delayed-profile creation section 3, in descending order of the average correlation values. Further, the path selection section 4 selects the corresponding reception timings, in descending order of the average correlation values, as candidates for finger assignment and performs determination shown in equations (3) and (4) below. When all the conditions are satisfied, the reception timings are assigned to fingers.

t "0", t "1", ..., t[m−1]: reception timings (m pieces) that have thus far assigned to fingers tc: reception timing selected as a candidate for finger assignment D_th: threshold for predetermined reception timing H_th: threshold for predetermined difference history $$\text{abs}(DP[tc][\text{Npow}-1]-DP[t[i]][\text{Npow}-1])>D\_th \quad (0 \leq i < m) \quad (3)$$

$$\sum_{j=1}^{Npow-1} (Hist[tc][j] \times Hist[t[i]][j]) < H\_th \quad (0 \leq i < m) \quad (4)$$

where abs(x) represents the absolute value of x.

Since Hist[t][0] represents the difference between a value of the 0th calculation and a value of the −1st calculation by the definition of Hist[][], Hist[t][0] is meaningless in reality and thus no addition is performed.

This processing is performed for all reception timings or is continued until the number of available fingers becomes zero. Reception timings which are assigned to fingers are issued to the finger section 5.

Figure 2:
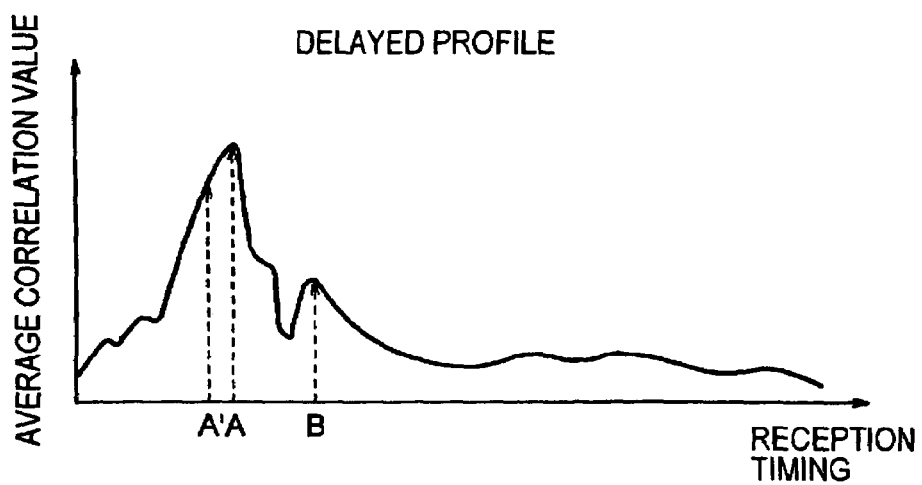
FIG. 2 is a graph showing a delayed profile for individual reception timings.
Figure 3:
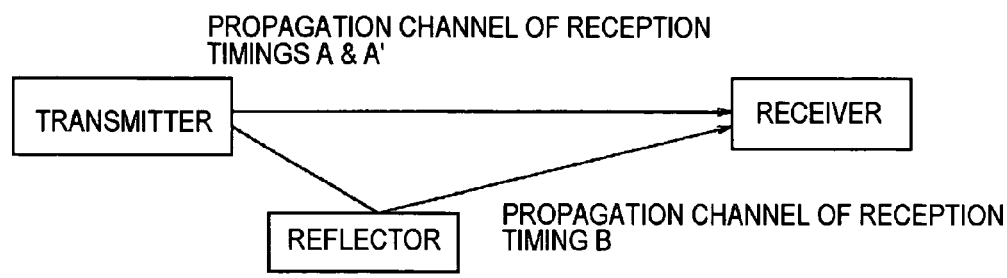
FIG. 3 is a diagram showing relationships between reception timings and propagation channels.
Figure 4:
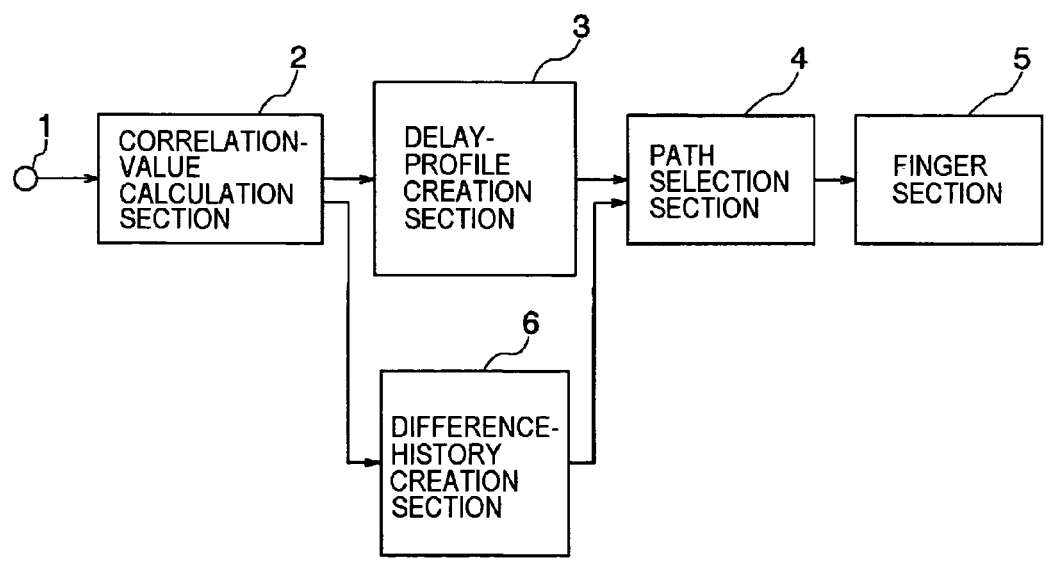
FIG. 4 is a diagram showing the configuration of a rake receiver according to an embodiment of the present invention.
Figure 5:
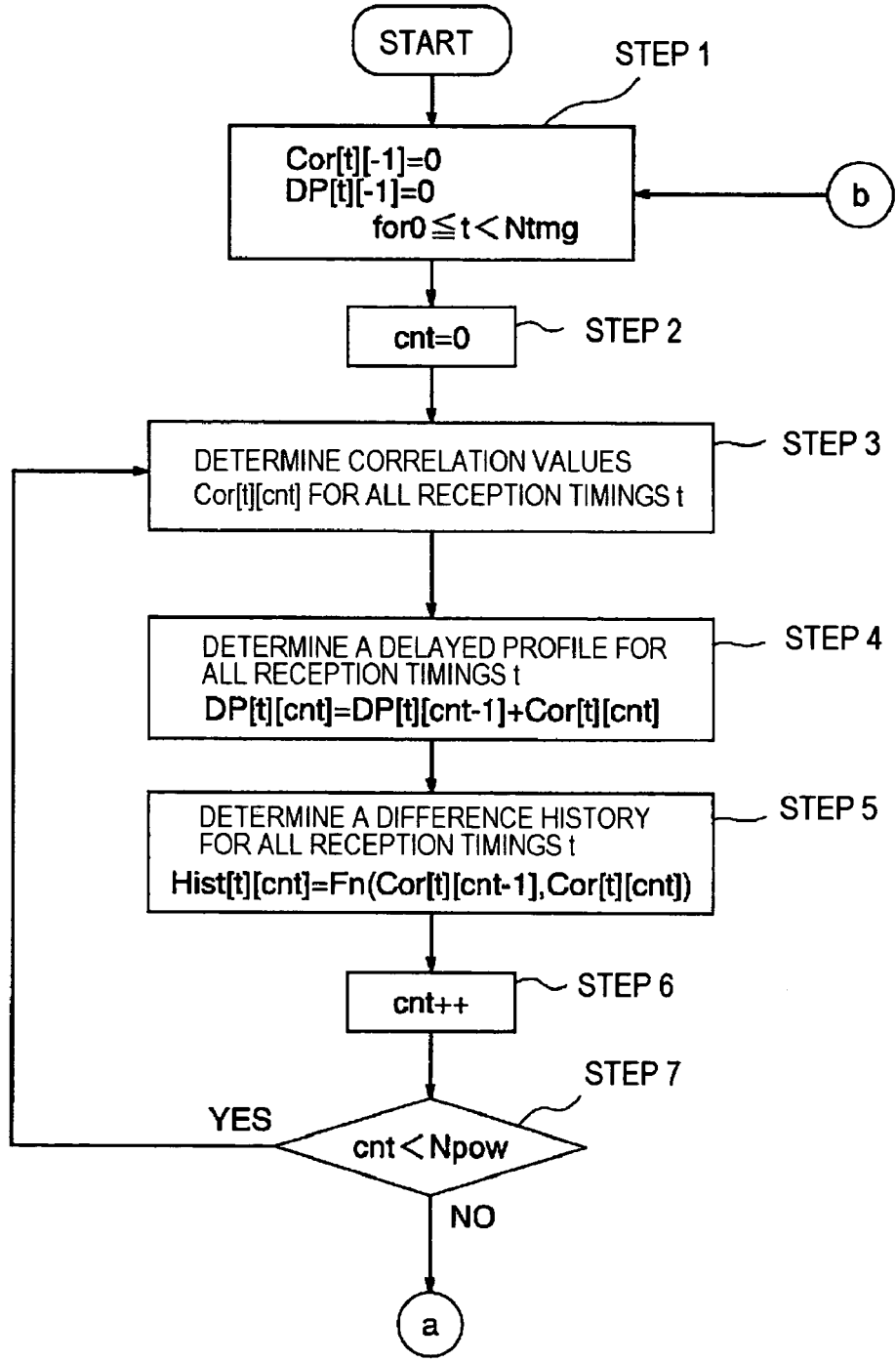
FIG. 5 is a flowchart illustrating the operation of the embodiment.
Figure 6:
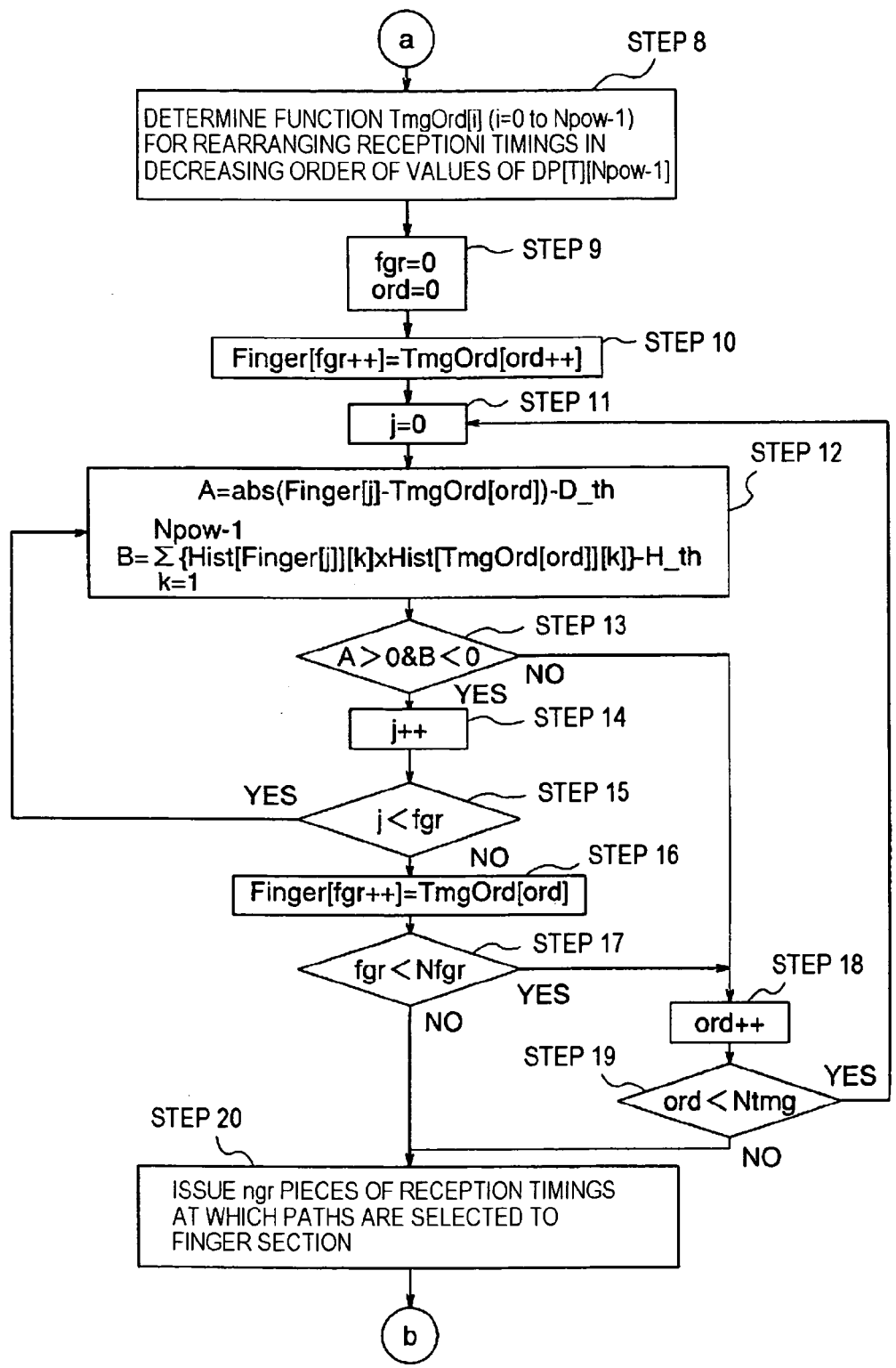
FIG. 6 is a flowchart illustrating the operation of the embodiment.

The operation of this embodiment will now be described with reference to flowcharts shown in FIGS. 2 and 3. First, Cor[t][−1] and DP[t][−1] stored in memory buffers of the correlation-value calculation section 2 and the delayed-profile creation section 3 are initialized to 0 (step 1).

Next, the correlation-value calculation section 2 obtains correlation between a spreading code and a reception signal input from the input terminal 1 to determine a correlation value Cor[t][cnt] (step 3). The determined correlation value Cor[t][cnt] is issued to the delayed-profile creation section 3, and a delayed profile DP[t][cnt] is determined (step 4). Additionally, the correlation value Cor[t][cnt] is issued to the difference-history creation section 6 and is compared with the previous correlation value Cor[t][cnt−1], so that a difference history Hist[t][cnt] is determined (step 5). The processing of steps 3 to 5 described above is repeated Npow times (steps 2, 6, and 7).

First, the path selection section 4 determines a function TmgOrd[i] (i=0 to Ntmg−1), which rearranges reception timings, in order of decreasing magnitude of delayed profiles DP[t][Npow−1] (t=0 to Ntmg−1) issued from the delayed-profile creation section 3 (step 8). This function TmgOrd[i] (i=0 to Ntmg−1) satisfies the following equation.

$$DP[\text{Ord}[i]][\text{Npow}-1] \geq DP[\text{TmgOrd}[i+j]][\text{Npow}-1]$$

for 0≦i<Npow−1
0≦j<Npow−1−i

For example, when Tx=TmgOrd[x] is satisfied, this signifies that "when the delayed profiles DP[t][Npow−1] are rearranged in decreasing order, xth reception timing from the top is Tx."

Next, reception timing having the greatest average correlation value in the delayed profile is initially assigned to one finger (step 10). Thereafter, reception timing which satisfies equations (3) and (4) noted above is searched for in decreasing order of the average correlation values. When found, the reception timing is assigned to a finger (steps 11 to 16 and 18). In this case, the path selection finishes when assignments to Nfgr fingers are completed (step 17) or examinations of all the Ntmg reception timings with equations (3) and (4) are completed (step 19). Thereafter, reception timings which have been assigned to fgr pieces of fingers (finger [0]... finger [fgr−1]) are issued to the finger section 5 (step 20).

When the issuance to the fingers 5 ends, the memory buffers of the correlation-value calculation section 2 and the delayed-profile creation section 3 are again initialized to 0, and the processing continues (step 1).

In another embodiment of the present invention, "Hist[t][n]" in equation (2) noted above is calculated as follows.

$$Hist[t][n]=Fn(Cor[t][n-1], Cor[t][n]) \times Cor[t][n] \quad (5)$$

where Fn (x,y)=[+1(x≦y), −1 (x>y)]

In the method using the equation (2), attention has been given to only the direction of a change, i.e., an increase or decrease, relative to the previous value. In equation (5), however, attention is also given to the magnitude of a correlation value other than the direction of a change.

As described above, when reception timing having a large correlation value is assigned to a finger to perform reception, a signal having a large Eb/IO is obtained. Thus, equation (5) offers an advantage in that a signal having a small Eb/IO is prevented from being assigned to a finger, which leads to an expectation that more efficient assignment can be performed.

INDUSTRIAL APPLICABILITY

As described above, according to the present invention, during assignment of reception timings to fingers, not only the differences between reception timings but also histories of change in correlation values are used as means for determining whether or not propagation channels are the same (=the same path), thereby allowing more accurate determination as to whether propagation paths are the same. Path assignment is possible such that satisfactory reception characteristics can be obtained in a fading environment, in the case of a limited number of fingers due to hardware conditions.

The invention claimed is:

1. A rake receiver in a CDMA mobile communication system, characterized by comprising:

a correlation-value calculation section for calculating correlation values between reception signals and spreading codes at all timings at which rake reception is possible;

a delayed-profile creation section for creating a delayed profile by determining an average correlation value from the correlation values for each reception timing, the correlation values being obtained from the correlation-value calculation section;

a difference-history creation section for creating a difference history by comparing the latest correlation value issued from the correlation-value calculation section with a previous correlation value for each reception timing;

a path selection section for rearranging the average correlation values in decreasing order, selecting a reception timing to be assigned to a finger in decreasing order of the average correlation values when the delayed profile and the difference history satisfy respective predetermined conditions, and issuing the reception timing to a finger section; and the finger section for performing reception corresponding to a path for each reception timing.

2. A rake receiver according to claim 1, characterized in that the difference history is defined by:

$$Hist[t][n]=Fn(Cor[t][n-1], Cor[t][n])$$

or $$Hist[t][n]=Fn(Cor[t][n-1], Cor[t][n])\times Cor[t][n]$$

where:
- Hist[t][n] is a difference history between a correlation value of the (n−1)th calculation of the correlation-value section and a correlation value of the nth calculation of the correlation-value calculation section,
- Cor[t][n] is a latest correlation value of the nth issuance from the correlation-value calculation section at reception timing t, and
- Fn is a function such that the value of Fn(x,y) is +1 in the range of (x≦y) and is −1 in the range of(x>y).

3. A rake receiver according to claim 2, characterized in that the path selection section selects a reception timing to be assigned to a finger in decreasing order of the correlation values, when the delayed profile satisfies $$abs(DP[tc][Npow-1]-DP[t[i]][Npow-1])>D\_th$$
(0≦i<m) m is integers and the difference history satisfies $$\sum_{j=1}^{Npow-1}(Hist[tc][i]\times Hist[t[i]][i])>H\_th \quad (0\leq i<m) \text{ m is integers}$$

where:
- tc is a reception timing selected as a candidate for finger assignment,
- Npow is a number of correlation values,
- DP[tc][Npow−1] is a result determined by addition of a correlation value of the (Npow−1)th issuance at reception timing tc,
- D_th is a threshold for predetermined reception timing,
- Hist[tc][j] is a difference history between a correlation value of the (tc−j)th calculation of the correlation-value section and a correlation value of the jth calculation of the correlation-value calculation section, and
- H_th is a threshold for predetermined difference history.

4. A rake receiver according to claim 1, characterized in that the path selection section selects a reception timing to be assigned to a finger in decreasing order of the correlation values, when the delayed profile satisfies $$abs(DP[tc][Npow-1]-DP[t[i]][Npow-1])>D\_th$$
(0≦i<m) m is integers and the difference history satisfies $$\sum_{j=1}^{Npow-1}(Hist[tc][i]\times Hist[t[i]][i])<H\_th \quad (0\leq i<m) \text{ m is integers}$$

where:
- tc is a reception timing selected as a candidate for finger assignment,
- Npow is a number of correlation values,
- DP[tc][Npow−1] is a result determined by addition of a correlation value of the (Npow−1)th issuance at reception timing tc,
- D_th is a threshold for predetermined reception timing,
- Hist[tc][j] is a difference history between a correlation value of the (tc−j)th calculation of the correlation-value section and a correlation value of the jth calculation of the correlation-value calculation section, and
- H_th is a threshold for predetermined difference history.

5. A rake receiving method in a CDMA mobile communication system, characterized by comprising:
- a step of determining correlation values by obtaining correlation between reception signals and spreading codes;
- a step of determining a delayed profile by determining an average correlation value from correlation values for each reception timing;
- a step of determining a difference history by comparing the latest correlation value with a previous correlation value for each reception timing;
- a step of rearranging the reception timings in decreasing order of the average correlation values;
- a step of assigning a reception timing at which the average correlation value is the largest to a finger; and
- a step of performing path selection by searching for the reception timing, in decreasing order of the average correlation values, at which the delayed profile and the difference history satisfy respective predetermined conditions and by repeating assignment processing to each finger until assignments to all the fingers are completed or determinations for all the reception timings are completed.

6. A rake receiving method according to claim 5, characterized in that the difference history is defined by:

$$Hist[t][n]=Fn(Cor[t][n-1], Cor[t][n])$$

or $$Hist[t][n]=Fn(Cor[t][n-1], Cor[t][n])\times Cor[t][n]$$

where:
- Hist[t][n] is a difference history between a correlation value of the (n−1)th calculation of the correlation-value section and a correlation value of the nth calculation of the correlation-value calculation section,
- Cor[t][n] is a latest correlation value of the nth issuance from the correlation-value calculation section at reception timing t, and
- Fn is a function such that the value of Fn(x,y) is +1 in the range of (x≦y) and is −1 in the range of (x>y).

7. A rake receiving method according to claim 6, characterized in that, during the path selection, a reception timing to be assigned to a finger in decreasing order of the correlation values is selected when the delayed profile satisfies $$abs(DP[tc][Npow-1]-DP[t[i]][Npow-1])>D\_th$$
(0≦i<m)

m is integers and the difference history satisfies $$\sum_{j=1}^{Npow-1}(Hist[tc][j]\times Hist[t[i]][j])<H\_th \quad (0\leq i<m)$$

where:
- tc is a reception timing selected as a candidate for finger assignment,
- Npow is a number of correlation values,
- DP[tc][Npow−1] is a result determined by addition of a correlation value of the (Npow−1)th issuance at reception timing tc,
- D_th is a threshold for predetermined reception timing,
- Hist[tc][j] is a difference history between a correlation value of the (j−1)th calculation of the correlation-value section and a correlation value of the jth calculation of the correlation-value calculation section, and H_th is a threshold for predetermined difference history.

8. A rake receiving method according to claim 5, characterized in that, during the path selection, a reception timing to be assigned to a finger in decreasing order of the correlation values is selected when the delayed profile satisfies $$\mathrm{abs}(DP[tc][Npow-1]-DP[t[i]][Npow-1])>D\_th$$
$$(0 \leq i < m)$$

m is integers and the difference history satisfies $$\sum_{j=1}^{Npow-1} (Hist[tc][j] \times Hist[t[i]][j]) < H\_th \quad (0 \leq i < m)$$

where:

tc is a reception timing selected as a candidate for finger assignment,

Npow is a number of correlation values,

DP[tc][Npow−1] is a result determined by addition of a correlation value of the (Npow−1)th issuance at reception timing tc, D_th is a threshold for predetermined reception timing, Hist[tc][j] is a difference history between a correlation value of the (tc−j)th calculation of the correlation-value section and a correlation value of the jth calculation of the correlation-value calculation section, and H_th is a threshold for predetermined difference history.

* * * * *